(12) United States Patent
Katsumata

(10) Patent No.: US 11,849,090 B2
(45) Date of Patent: Dec. 19, 2023

(54) IMAGE FORMING APPARATUS, CORRECTION METHOD, AND CORRECTION PROGRAM

(71) Applicant: Konica Minolta, Inc., Tokyo (JP)

(72) Inventor: Keiki Katsumata, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/954,396

(22) Filed: Sep. 28, 2022

(65) Prior Publication Data

US 2023/0116640 A1 Apr. 13, 2023

(30) Foreign Application Priority Data

Oct. 7, 2021 (JP) ................................. 2021-165418

(51) Int. Cl.
H04N 1/00 (2006.01)

(52) U.S. Cl.
CPC ... *H04N 1/0066* (2013.01); *H04N 2201/0094* (2013.01)

(58) Field of Classification Search
CPC . B26D 5/32; B26F 1/0092; B26F 1/12; B26F 1/36; B41J 11/663; B41K 3/36; G03G 15/1605; G03G 15/2064; G03G 15/235; G03G 15/36; G03G 15/5062; G03G 15/55; G03G 15/6564; G03G 15/6567; G03G 15/6573; G03G 2215/00067; G03G 2215/00569; G03G 2215/00721; G03G 2215/00734; G03G 2215/00755; G03G 2215/0129; G03G 2215/0161; G03G 15/6544; G03G 2215/00831; G03G 2215/00936; G06F 3/1204; G06F 3/1206; G06F 3/1245; G06F 3/1254; G06F 3/1284; B42B 2/02; B42B 4/00; B42C 1/12; B42C 5/00; B65H 37/04
USPC .......................................... 358/471; 382/275
See application file for complete search history.

(56) References Cited

U.S. PATENT DOCUMENTS

| | | | |
|---|---|---|---|
| 10,723,159 B2 * | 7/2020 | Horiuchi | G09F 13/04 |
| 2005/0265761 A1 * | 12/2005 | Kawaai | G03G 15/6564 |
| | | | 399/394 |
| 2007/0019222 A1 * | 1/2007 | Oda | G06F 3/1245 |
| | | | 358/1.13 |
| 2007/0057987 A1 * | 3/2007 | Miyamoto | G06F 3/0321 |
| | | | 347/19 |
| 2014/0035218 A1 * | 2/2014 | Koyama | B41J 25/308 |
| | | | 271/3.14 |
| 2014/0154030 A1 * | 6/2014 | Kimura | B65H 37/04 |
| | | | 412/1 |
| 2014/0224138 A1 * | 8/2014 | Tokumaru | B26F 1/12 |
| | | | 101/26 |
| 2018/0311902 A1 * | 11/2018 | Ho | B33Y 50/02 |
| 2019/0278210 A1 * | 9/2019 | Sekita | G03G 15/5062 |

(Continued)

FOREIGN PATENT DOCUMENTS

JP 2005-254587 A 9/2005

*Primary Examiner* — Negussie Worku

(74) *Attorney, Agent, or Firm* — Rankin, Hill & Clark LLP

(57) ABSTRACT

An image forming apparatus includes: an image former that forms, on an end surface of each layer of a layered printed matter or on a layered surface formed by layering cross sections of printed matter cut in the post-processing step, a layer image for expressing a predetermined image on each layer; and a hardware processor that corrects a printing position of the layer image on each layer.

13 Claims, 8 Drawing Sheets

(56) References Cited

U.S. PATENT DOCUMENTS

| | | | |
|---|---|---|---|
| 2020/0338907 A1* | 10/2020 | Shinkai | ............... B41J 2/2135 |
| 2022/0293020 A1* | 9/2022 | Sakurai | ............... G09F 19/14 |
| 2023/0173826 A1* | 6/2023 | Tanto | ............... B41J 11/0024 |
| | | | 347/102 |
| 2023/0173828 A1* | 6/2023 | Chang | ............... B41J 11/46 |
| | | | 347/107 |

* cited by examiner

FIG. 6

| 0% ≤ IMAGE AREA RATIO < 10% | 10% ≤ IMAGE AREA RATIO < 50% | 50% ≤ IMAGE AREA RATIO < 100% |
|---|---|---|
| T | T × 0.01% | T × 0.05% |

# IMAGE FORMING APPARATUS, CORRECTION METHOD, AND CORRECTION PROGRAM

The entire disclosure of Japanese patent Application No. 2021-165418, filed on Oct. 7, 2021, is incorporated herein by reference in its entirety.

BACKGROUND

Technological Field

The present invention relates to an image forming apparatus, a correction method, and a correction program.

Description of the Related Art

In general, a technique for printing an image on a layered surface (for example, a fore edge of a book or the like) of a layered printed matter obtained by layering printed matter is known. For example, JP 2005-254587 A discloses a configuration in which a solid mark is formed at an edge of each page of a layered printed matter, and the solid marks on a layered surface when the layered printed matter is formed are combined to express a predetermined image.

Meanwhile, a read image to be read by a reading device, such as a quick response (QR) code (registered trademark) or a barcode, may be formed in a predetermined image on a layered printed matter. Therefore, from the viewpoint of preventing erroneous reading by the reading device, high accuracy is required in the above-described technique.

However, in the technique described in JP 2005-254587 A, there is a possibility that a displacement occurs in a printing position of a layer image formed on each layer due to a variation in stretch/shrink characteristics of a medium constituting a layered printed matter, a thickness variation due to a difference in an image area ratio formed on a medium of each layer, and the like.

SUMMARY

An object of the present invention is to provide an image forming apparatus, a correction method, and a correction program capable of suppressing occurrence of displacement of a printing position of a layer image of each layer in a layered printed matter.

To achieve the abovementioned object, according to an aspect of the present invention, an image forming apparatus reflecting one aspect of the present invention comprises: an image former that forms, on an end surface of each layer of a layered printed matter or on a layered surface formed by layering cross sections of printed matter cut in the post-processing step, a layer image for expressing a predetermined image on each layer; and a hardware processor that corrects a printing position of the layer image on each layer.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a diagram illustrating an example of a correction table based on an image area ratio;

DETAILED DESCRIPTION OF EMBODIMENTS

Figure 1:
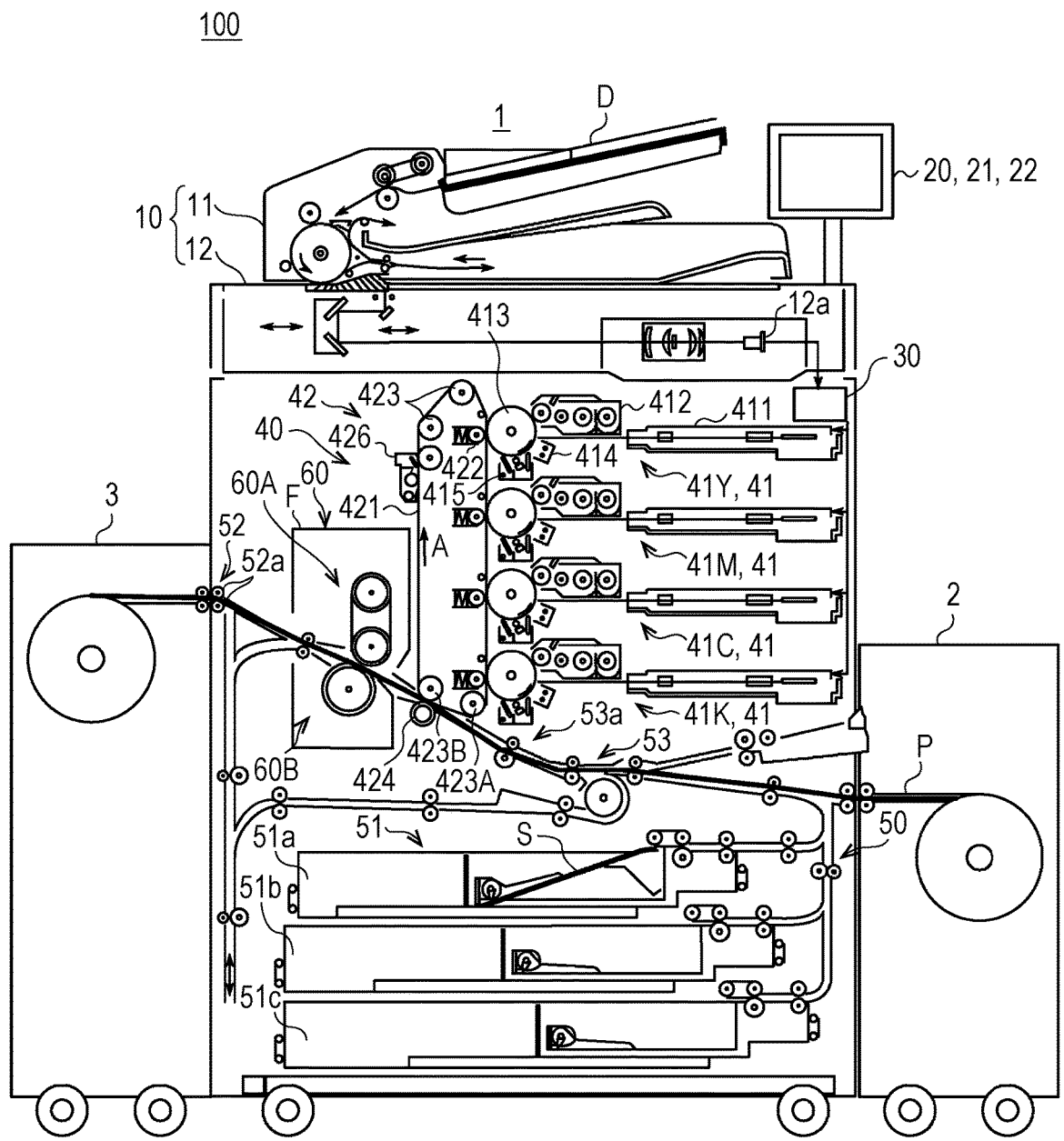
FIG. 1 is a diagram schematically illustrating an overall configuration of an image forming system according to an embodiment of the present invention.
Figure 2:
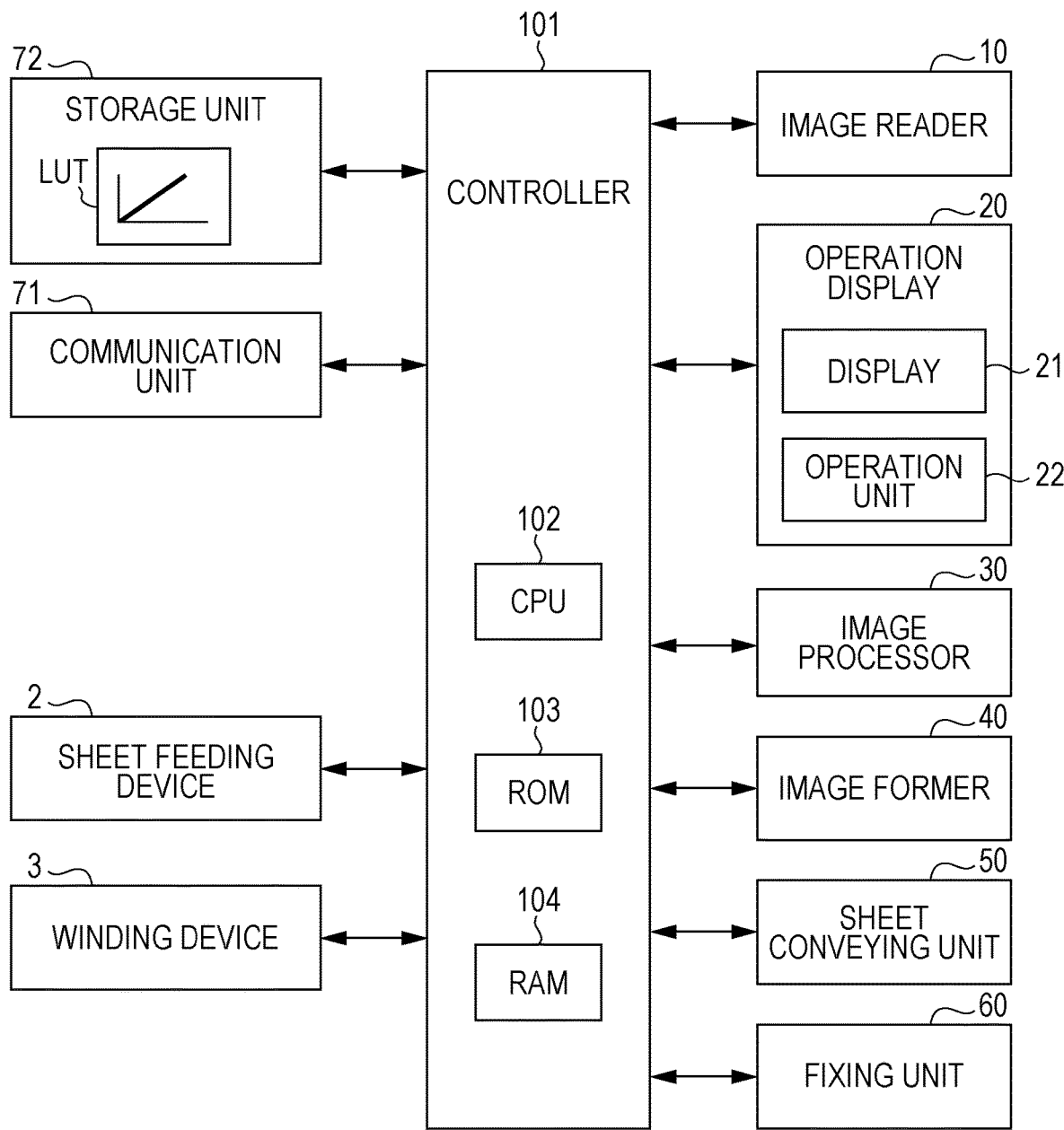
FIG. 2 is a diagram illustrating a main part of a control system of an image forming apparatus included in the image forming system according to the present embodiment.

Hereinafter, one or more embodiments of the present invention will be described with reference to the drawings. However, the scope of the invention is not limited to the disclosed embodiments. FIG. 1 is a diagram schematically illustrating an overall configuration of an image forming system 100 according to an embodiment of the present invention. FIG. 2 is a diagram illustrating a main part of a control system of an image forming apparatus 1 included in the image forming system 100 according to the present embodiment. The image forming system 100 is a system that forms an image on a recording medium (a recording medium including continuous paper P, non-continuous paper S or the like indicated by a thick line in FIG. 1). Here, the continuous paper P is, for example, a roll paper having a length exceeding the main body width of the image forming apparatus 1 in the conveyance direction.

As illustrated in FIG. 1, the image forming system 100 includes a sheet feeding device 2, the image forming apparatus 1, and a winding device 3 which are connected in order from an upstream side along the conveyance direction of the continuous paper P.

The sheet feeding device 2 is a device that feeds the continuous paper P to the image forming apparatus 1. In a housing of the sheet feeding device 2, the continuous paper P is held in a state of being wound around a support shaft in a roll shape. The sheet feeding device 2 conveys the continuous paper P wound around the support shaft to the image forming apparatus 1 at a constant speed via a plurality of conveyance roller pairs such as feeding rollers and sheet feeding rollers. The sheet feeding operation of the sheet feeding device 2 is controlled by a controller 101 included in the image forming apparatus 1.

The image forming apparatus 1 is an intermediate transfer type color image forming apparatus using an electrophotographic process technology. In other words, the image forming apparatus 1 primarily transfers toner images of respective colors of Y (yellow), M (magenta), C (cyan), and K (black) formed on photosensitive drums 413 to an intermediate transfer belt 421, superimposes the toner images in the four colors on the intermediate transfer belt 421, and then secondarily transfers the toner images to the continuous paper P fed from the sheet feeding device 2 or the paper S fed from the sheet feed tray units 51a to 51c, thereby forming an image.

In addition, the image forming apparatus 1 employs a tandem system in which the photosensitive drums 413 corresponding to the four colors of YMCK are arranged in series in the traveling direction of the intermediate transfer belt 421, and the toner images in the respective colors are sequentially transferred to the intermediate transfer belt 421 in one procedure.

As illustrated in FIG. 2, the image forming apparatus 1 includes an image reader 10, an operation display 20, an image processor 30, an image former 40, a sheet conveying unit 50, a fixing unit 60, and the controller 101.

The controller 101 includes a central processing unit (CPU) 102, a read only memory (ROM) 103, a random access memory (RAM) 104, and the like. The CPU 102 reads a program corresponding to the processing content from the ROM 103, develops the program in the RAM 104, and centrally controls the operation of each block or the like of the image forming apparatus 1 in cooperation with the developed program. At this time, various data stored in a storage unit 72 are referred to. The storage unit 72 includes, for example, a nonvolatile semiconductor memory (so-called flash memory) or a hard disk drive.

The controller 101 transmits and receives, via a communication unit 71, various data to and from an external device (for example, a personal computer) connected to a communication network such as a local area network (LAN) or a wide area network (WAN). For example, the controller 101 receives image data transmitted from an external device, and forms an image on the continuous paper P or the paper S based on the image data (input image data). The communication unit 71 includes, for example, a communication control card such as a LAN card.

As illustrated in FIG. 1, the image reader 10 includes an automatic document feeder (ADF) 11, a document image scanner (scanner) 12, and the like.

The automatic document feeder 11 conveys a document D placed on a document tray by a conveying mechanism and sends the document D to the document image scanner 12. With the automatic document feeder 11, images (including both sides) of a large number of documents D placed on the document tray can be continuously read at once.

The document image scanner 12 optically scans a document conveyed onto a contact glass from the automatic document feeder 11 or a document placed on the contact glass, forms an image of reflected light from the document on a light receiving surface of a charge coupled device (CCD) sensor 12a, and reads the document image. The image reader 10 generates input image data based on a reading result by the document image scanner 12. The input image data is subjected to predetermined image processing in the image processor 30.

As illustrated in FIG. 2, the operation display 20 includes, for example, a liquid crystal display (LCD) with a touch panel, and functions as a display 21 and an operation unit 22. The display 21 displays various operation screens, an image state, an operation status of each function, and the like according to a display control signal input from the controller 101. The operation unit 22 includes various operation keys such as a numeric keypad and a start key, receives various input operations by a user, and outputs an operation signal to the controller 101.

The image processor 30 includes a circuit or the like that performs digital image processing according to initial setting or user setting on the input image data. For example, the image processor 30 performs tone correction based on tone correction data (tone correction table) under the control of the controller 101. In addition to the tone correction, the image processor 30 performs various correction processing such as color correction and shading correction, compression processing, and the like on the input image data. The image former 40 is controlled based on the image data subjected to these processes.

As illustrated in FIG. 1, the image former 40 includes image forming units 41Y, 41M, 41C, and 41K for forming images with color toners of a Y component, an M component, a C component, and a K component based on input image data, an intermediate transfer unit 42, and the like.

The image forming units 41Y, 41M, 41C, and 41K for the Y component, the M component, the C component, and the K component have the same configuration. For convenience of illustration and description, common components are denoted by the same reference numerals, and Y, M, C, or K is added to the reference numerals to distinguish the components. In FIG. 1, only the components of the image forming unit 41Y for the Y component are denoted by reference numerals, and the reference numerals of the other components of the image forming units 41M, 41C, and 41K are omitted.

The image forming unit 41 includes an exposure device 411, a developing device 412, the photosensitive drum 413, a charging device 414, a drum cleaning device 415, and the like.

The photosensitive drum 413 is, for example, a negative charge type organic photo-conductor (OPC) in which an under coat layer (UCL), a charge generation layer (CGL), and a charge transport layer (CTL) are sequentially laminated on a peripheral surface of an aluminum conductive cylindrical body (aluminum tube).

The controller 101 rotates the photosensitive drum 413 at a constant peripheral speed by controlling a drive current supplied to a drive motor (not illustrated) that rotates the photosensitive drum 413.

The charging device 414 uniformly charges the surface of the photosensitive drum 413 having photoconductivity to negative polarity. The exposure device 411 includes, for example, a semiconductor laser, and irradiates the photosensitive drum 413 with laser light corresponding to an image of each color component.

The developing device 412 is a two-component developing type developing device, and forms a toner image by visualizing an electrostatic latent image by attaching a toner of each color component to the surface of the photosensitive drum 413.

The drum cleaning device 415 includes a drum cleaning blade or the like in sliding contact with the surface of the photosensitive drum 413, and removes transfer residual toner remaining on the surface of the photosensitive drum 413 after the primary transfer.

The intermediate transfer unit 42 includes the intermediate transfer belt 421, a primary transfer roller 422, a plurality of support rollers 423, a secondary transfer roller 424, a belt cleaning device 426, and the like.

The intermediate transfer belt 421 is an endless belt, and is stretched around the plurality of support rollers 423 in a loop shape. At least one of the plurality of support rollers 423 is a driving roller, and the others are driven rollers. For example, the roller 423A disposed on the downstream side in the belt traveling direction of the primary transfer roller 422 for the K component is preferably a driving roller. With his configuration, the traveling speed of the belt in the primary transfer portion can be easily kept constant. As the driving roller 423A rotates, the intermediate transfer belt 421 travels at a constant speed in the direction of the arrow A.

The intermediate transfer belt 421 is a belt having conductivity and elasticity, and is rotationally driven by a control signal from the controller 101.

The primary transfer roller 422 is disposed on the inner peripheral surface side of the intermediate transfer belt 421 so as to face the photosensitive drum 413 of each color component. The primary transfer roller 422 is pressed against the photosensitive drum 413 with the intermediate transfer belt 421 interposed therebetween, thereby forming a primary transfer nip for transferring a toner image from the photosensitive drum 413 to the intermediate transfer belt 421.

The secondary transfer roller 424 is disposed on the outer peripheral surface side of the intermediate transfer belt 421 while facing a backup roller 423B disposed on the downstream side in the belt traveling direction of the driving roller 423A. When the secondary transfer roller 424 is pressed against the backup roller 423B with the intermediate transfer belt 421 interposed therebetween, a secondary transfer nip for transferring a toner image from the intermediate transfer belt 421 to the continuous paper P or the paper S is formed.

When the intermediate transfer belt 421 passes through the primary transfer nip, the toner images on the photosensitive drums 413 are sequentially superimposed and primarily transferred onto the intermediate transfer belt 421. Thereafter, when the continuous paper P or the paper S passes through the secondary transfer nip, the toner images on the intermediate transfer belt 421 are secondarily transferred to the continuous paper P or the paper S. The continuous paper P or the paper S to which the toner images have been transferred is conveyed toward the fixing unit 60.

The belt cleaning device 426 removes transfer residual toner remaining on the surface of the intermediate transfer belt 421 after the secondary transfer.

The fixing unit 60 includes an upper fixing unit 60A having a fixing surface side member disposed on the fixing surface of the continuous paper P or the paper S, that is, the surface on which the toner image is formed, a lower fixing unit 60B having a back surface side support member disposed on the back surface of the continuous paper P or the paper S, that is, the surface opposite to the fixing surface, and the like. When the back surface side support member is brought into pressure contact with the fixing surface side member, a fixing nip that holds and conveys the continuous paper P or the paper S is formed.

The fixing unit 60 fixes the toner image on the continuous paper P or the paper S by heating and pressurizing the conveyed continuous paper P or the paper S to which the toner images have been secondarily transferred at the fixing nip. The fixing unit 60 is disposed as a unit in the fixing device F.

The sheet conveying unit 50 includes a sheet feeder 51, a sheet ejector 52, a conveyance path portion 53, and the like. In three sheet feed tray units 51a to 51c constituting the sheet feeder 51, paper S (standard paper, special paper) identified based on basis weight, size, and the like are stored for each preset type. The conveyance path portion 53 includes a plurality of conveyance roller pairs including a registration roller pair 53a.

The paper S stored in the sheet feed tray units 51a to 51c are sent out one by one from the top, and are conveyed to the image former 40 by the conveyance path portion 53. In the image former 40, the toner images on the intermediate transfer belt 421 are secondarily transferred collectively to one surface of the paper S, and a fixing step is performed in the fixing unit 60.

Further, the continuous paper P fed from the sheet feeding device 2 to the image forming apparatus 1 is conveyed to the image former 40 by the conveyance path portion 53. Then, in the image former 40, the toner images on the intermediate transfer belt 421 are secondarily transferred collectively to one surface of the continuous paper P, and a fixing step is performed in the fixing unit 60.

The continuous paper P on which the image is formed is conveyed to the winding device 3 by the sheet ejector 52 including the conveyance roller pair (paper ejection roller pair) 52a.

The winding device 3 is a device that winds the continuous paper P conveyed from the image forming apparatus 1. In the housing of the winding device 3, for example, the continuous paper P is wound around the winding shaft and held in a roll shape. Therefore, the winding device 3 winds the continuous paper P conveyed from the image forming apparatus 1 around a winding shaft at a constant speed via a plurality of conveyance roller pairs (for example, feed rollers and sheet discharge rollers). The winding operation of the winding device 3 is controlled by the controller 101 included in the image forming apparatus 1.

Meanwhile, a predetermined image may be formed on a layered surface of the layered printed matter after printing. The layered printed matter is a plurality pieces of paper S discharged to the sheet ejector (not illustrated) and layered, or a continuous paper P wound in a roll shape in the winding device 3.

Figure 3A:
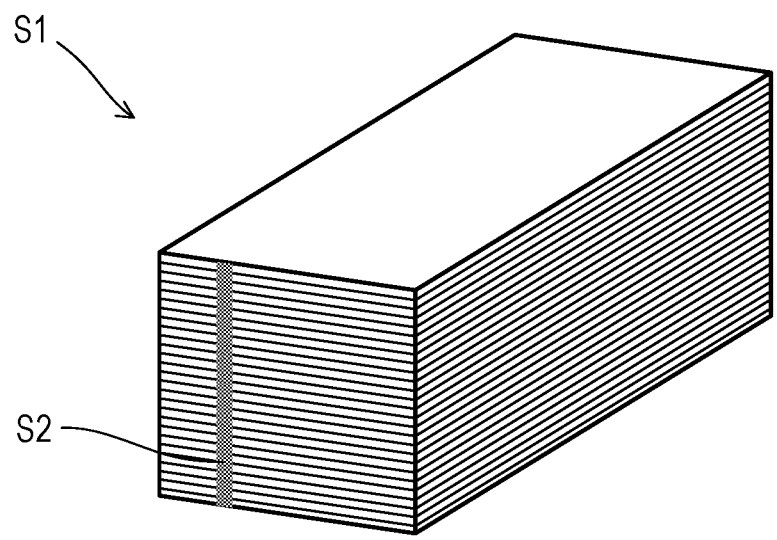
FIG. 3A is a view illustrating an example of a layered printed matter including a plurality of sheets.
Figure 3B:
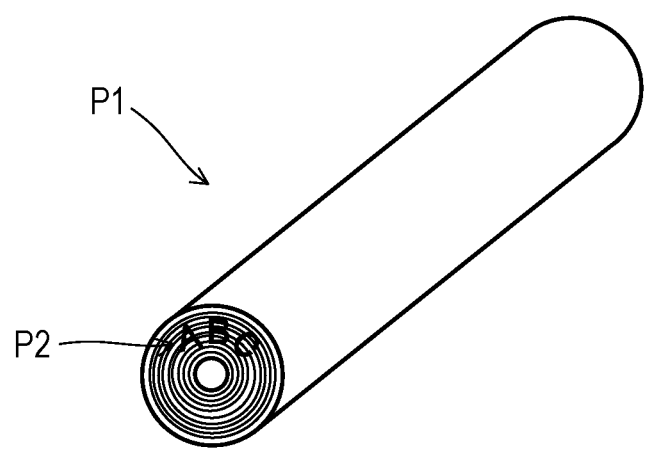
FIG. 3B is a view illustrating an example of a layered printed matter formed of continuous paper.

FIG. 3A illustrates a layered printed matter S1 including a plurality of stacked pieces of paper S. FIG. 3B illustrates a layered printed matter P1 including the continuous paper P wound in a roll shape.

In this case, the image former 40 forms a layer image at an edge of the medium constituting each layer of the layered printed matter. The medium is one piece of paper S corresponding to the layer or a part of the continuous paper P corresponding to the layer.

The layered surface is a surface formed by stacking end surfaces of the respective layers of the layered printed matter. When the edge of the layered printed matter is cut in the post-processing step, the layered surface may be formed by layering the cross sections of the layered printed matter cut in the post-processing step.

The predetermined image is an image in which predetermined information can be expressed by stacking layers. Examples of the predetermined image include a code such as a QR code or a barcode, management information of printed matter such as user information, customer information, print date and time, a job number, and a printing office number, and information such as position information, a pattern, and letters indicating position of a plurality of jobs on the layered printed matter by color-coding each layer.

The layer image is an image formed at a position corresponding to the layered surface of the medium constituting each layer in the layered printed matter. By combining the layer images of the respective media, a predetermined image is expressed.

A predetermined image S2 extending in a direction in which the layers are stacked is formed on the layered printed matter S1 in FIG. 3A. A predetermined image P2 including three letters "ABC" is formed on the layered printed matter P1 in FIG. 3B.

By forming the predetermined image on the layered surface of the layered printed matter in this manner, for example, the layered printed matter can be easily identified. For example, the continuous paper P after printing is stored in a state of being wound in a roll shape, but there is a case where the end portion of the continuous paper P is left blank, and the end portion is arranged on an outer surface side of the layered printed matter to protect the printing surface of the layered printed matter. Further, since the continuous paper P wound in a roll shape is long in the axial direction, there is a case where the continuous paper P is stacked horizontally in the axial direction or vertically placed in a box and stored.

In these cases, since it is difficult to confirm the content of the continuous paper P in the storage state, it is easy to grasp the content of the continuous paper P in the storage state by expressing information (management number or the like) formed on the printing surface of the continuous paper P on the layered surface of the continuous paper P as a predetermined image.

In a case where the layered printed matter is a plurality of pieces of paper S, for example, a layer image to be a solid image is formed at a position corresponding to the layered surface (an edge of the medium or the like), and the layer images of the respective pieces of paper S are joined together to express a predetermined image. Depending on the predetermined image, the length of each layer image and the printing position on the medium constituting each layer may be the same or different.

Figure 4:
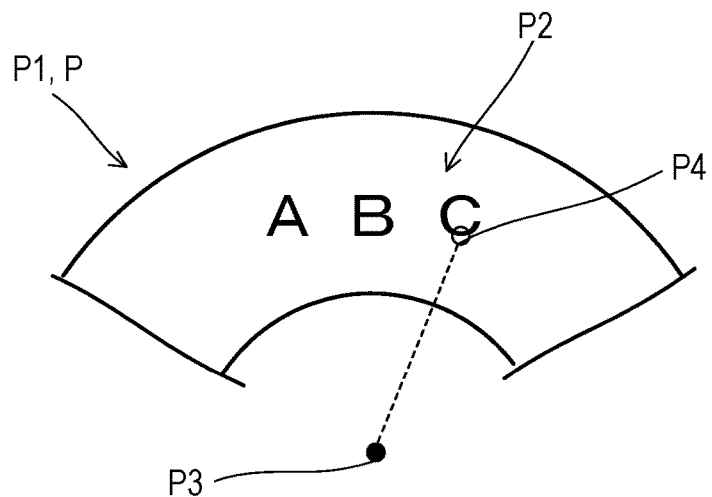
FIG. 4 is a diagram for explaining a method of calculating a printing position in a layered printed matter formed of continuous paper.

As illustrated in FIG. 4, in a case where the layered printed matter P1 is the continuous paper P, the continuous paper P is layered in a state of being curved in a roll shape (arc shape), and thus, for example, the printing position of the image data on the continuous paper P is adjusted after XY coordinates in the image data of the layer image are converted into rθ coordinates.

In the XY coordinates, for example, a position component in the width direction of the medium constituting the layer is an X coordinate, and a position component in the conveyance direction of the medium is a Y coordinate. In the rθ coordinate, for example, a component of a distance (radius) from the center P3 of the layered printed matter P1 to a printing position of the medium (a position corresponding to any portion of the predetermined image P2) is set as an r coordinate, and a component of an angle [rad] formed by a line connecting the printing position of the medium and the center of the layered printed matter and a predetermined direction (for example, a horizontal direction) is set as a θ coordinate.

For example, in a case where it is desired to form a part of the predetermined image P2 from the center P3 to the position P4 in the predetermined image P2, a component of a distance from the center P3 to a layer corresponding to the position P4 is set as an r coordinate, and a component of an angle formed by the horizontal direction and a line connecting P3 and P4 is set as a θ coordinate.

In the r coordinate, when an axial radius is R, a thickness of the medium at the printing position corresponding to the r coordinate is T, and the number of layers (turns) to the medium at the printing position corresponding to the r coordinate is N, these parameters have a relationship as expressed in following Equation (1).

$$NT = r - R \quad (1)$$

Further, the roll circumferential length (also referred to as a roll distance) of the N-th circumference of the layered printed matter when the θ coordinate is π can be indicated by $2\pi \times \{R+(N-1)\times T\}$, and thus the roll distance at the position of the angle θ is $2\theta \times \{R+(N-1)\times T\}$. The total roll distance up to the (N−1)th turn can be expressed by, for example, $(N-1)/2 \times \{4\pi R+(N-2)\times 2\pi T\}$, so that the total roll distance at the position of the angle θ can be expressed by, for example, $(N-1)/2 \times \{4\pi R+(N-2)\times 2\pi T\}+2\theta \times \{R+(N-1)\times T\}$.

As described above, the printing position of the layer image on the continuous paper P can be adjusted based on the relationship between the rθ coordinate and the total roll distance at the position based on the rθ coordinate.

Note that the above adjustment method is an example, and the printing position of the layer image may be adjusted by another adjustment method. In addition, the predetermined image (each layer image) may be adjusted to have an arc shape in accordance with the arc formed by the continuous paper P.

In the medium constituting such a layered printed matter, there is a risk that a displacement may occur in the printing position of the layer image formed on each layer.

In the medium, the moisture content of the medium varies due to environmental conditions at the time of storage or printing of the medium, and the medium stretches and shrinks. For example, as the moisture content of the medium increases, the moisture escapes in the fixing unit 60, and thus the medium shrinks. Since the degree of stretch and shrink of the medium varies depending on environmental conditions and the like, when a layer image is formed under a certain condition, a displacement occurs in the printing position due to the degree of stretch and shrink when the layered printed matter is formed. For example, when the medium shrinks, the layer image is formed at an earlier timing than the target position in the case of the continuous paper P, and when the medium stretches, the layer image is formed at a later timing than the target position in the case of the continuous paper P (see FIG. 5).

In order to suppress such a displacement in the printing position of the layer image, in the present embodiment, the printing position of the layer image is corrected. That is, the controller 101 corrects the printing position of the layer image of each layer constituting the predetermined image. The controller 101 corresponds to a "corrector" of the present invention.

Specifically, the controller 101 estimates the displacement of the printing position from the target position of the layer image in the image data, and corrects the printing position based on the estimation result.

More specifically, for example, the controller 101 estimates the stretch/shrink correction ratio in the length direction of the medium based on the water content of the medium constituting the layered printed matter, and estimates the displacement of the printing position from the target position based on the estimated stretch/shrink correction ratio. Then, when the controller 101 estimates that the displacement of the printing position occurs, the printing position based on the length direction of the medium is corrected.

The length direction of the medium is a direction along a side corresponding to a layered surface of the medium or a side on which a layer image of the medium is formed, and is, for example, a direction along a conveyance direction of the medium in the image forming apparatus 1.

A stretch/shrink correction ratio indicates, for example, a degree of change in the length direction of the printing position of the image on the medium. For example, by multiplying the distance (printing position) in the length direction of the medium in the image data by the stretch/ shrink correction ratio, it is possible to calculate the printing position that cancels the displacement in the printing position of the layer image.

In general, when the medium is heated and fixed by the fixing unit 60 as the moisture content in the medium increases, the evaporation amount of water contained in the medium increases, and eventually the shrinkage amount of the medium increases. Therefore, according to the present embodiment, the stretch/shrink correction ratio of the medium based on the moisture content of the medium is calculated using the temperature change of the fixing unit 60 and surrounding humidity of the image forming apparatus 1. The stretch/shrink correction ratio can be calculated by, for example, following Equation (2).

$$\text{stretch/shrink correction ratio (\%)} = 0.02 \times \Delta T + (H - 50) \quad (2)$$

$\Delta T$ in Equation (2) is a change amount of the fixing temperature with respect to the set value, and is a difference between the set value and the temperature of the fixing unit 60 detected by, for example, a temperature detector provided in the fixing unit 60.

H is humidity (%) outside the image forming apparatus 1. H is, for example, humidity based on information acquired from a humidity detector. The humidity detector may be provided in the image forming apparatus 1 or may be provided around the image forming apparatus 1. Equation (2) is an example, and can be appropriately changed according to the type of medium. The printing position in the length direction may be corrected by another method.

In this manner, the controller 101 corrects the printing position based on the length direction by acquiring the information on the fixing temperature and the information on the humidity outside the image forming apparatus 1.

For example, when the amount of shrinkage of the medium is relatively large, the printing position of the layer image is at a timing earlier than the target position (position set in the image data). In this case, the controller 101 corrects the printing position of the layer image so as to be displaced from the target position, for example, on the basis of the above-described stretch/shrink ratio.

When the stretch amount of the medium is relatively large, the printing position of the layer image is at a position at a timing later than the target position, contrary to the control when the shrink amount of the medium is relatively large. Therefore, the controller 101 corrects the printing position of the layer image to be shifted forward compared to the target position.

In this way, since the displacement of the printing position in the length direction of the layer image can be canceled, the occurrence of the displacement in the printing position of the layer image of each layer in the layered printed matter can be suppressed.

Furthermore, the controller 101 may correct the displacement of the printing position based on the thickness direction of the layered printed matter. The thickness direction of the layered printed matter is a direction based on the thickness of the medium, and is a direction along a direction in which each medium constituting the layered printed matter is layered.

Since different images are formed on each layer in the layered printed matter, some layers have a small image area ratio and some have a large image area ratio. Depending on the image area ratio of each layer, the toner amount varies for each layer, and the thickness of each layer varies due to the toner amount. For example, as the image area ratio of the image formed on the medium increases, the toner amount increases, and the thickness of the layer in the medium increases.

When the layer thickness increases, the thickness of the layered printed matter increases, and the layer image formed on the layered printed matter is displaced in the thickness direction.

For example, when the layered printed matter is the paper S, the layer image is shifted in the thickness direction of the layered printed matter, that is, in the upward direction. When the layered printed matter is the continuous paper P, the layer image is displaced in the thickness direction of the layered printed matter, that is, in the direction from the center toward the outside of the layered printed matter.

Figure 5:
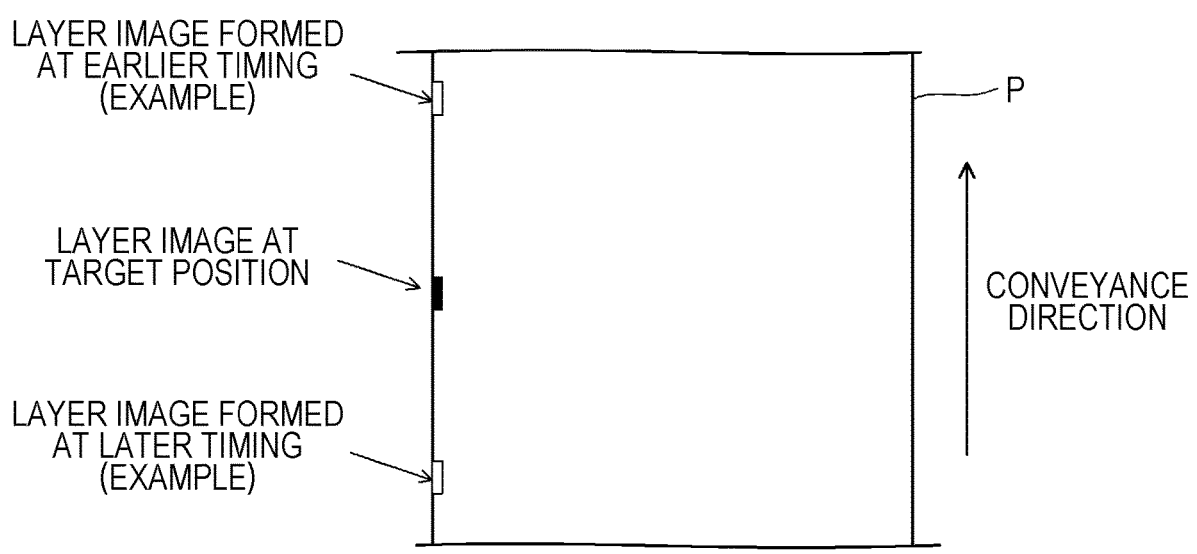
FIG. 5 is a view for describing a displacement of a printing position of a layer image formed on a medium.

In particular, in a case where the layered printed matter is the continuous paper P, when the thickness of the medium increases, the winding radius of the roll-shaped layered printed matter becomes larger than the preferable state, and the printing position of the layer image is formed at an earlier timing than the target position and is formed to be displaced forward (see FIG. 5).

Therefore, the controller 101 acquires information of the image data formed on the medium, estimates the displacement of the printing position from the target value based on the image area ratio related to the image data, and corrects the printing position based on the thickness direction. For example, it is assumed that the layered printed matter is the continuous paper P. In this case, the controller 101 corrects T corresponding to the thickness of Equation (1) with reference to the table illustrated in FIG. 6 based on the image area ratio.

For example, in a case where the image area ratio is 0 or more and less than 10%, the controller 101 determines the thickness as T. In other words, in this case, no correction is made. In a case where the image area ratio is 10% or more and less than 50%, the controller 101 determines the thickness as T×0.01%. In a case where the image area ratio is 50% or more and less than 100%, the controller 101 determines the thickness as T×0.05%.

Here, the printing position of the layer image on the continuous paper P is corrected by calculating the roll distance based on the r$\theta$ coordinate based on the determined thickness. Specifically, correction is performed such that the thickness T decreases as the image area ratio increases.

That is, as the image area ratio increases, the controller 101 corrects the printing position so that the printing position of the layer image comes at a timing later than the target position.

In this way, since the displacement of the printing position in the thickness direction of the layer image can be canceled, the occurrence of the displacement in the printing position of the layer image of each layer in the layered printed matter can be suppressed.

Furthermore, the controller 101 may perform both the above-described correction in the length direction and the above-described correction in the thickness direction. That is, the controller 101 may correct the printing position based on the length direction of the medium constituting the layered printed matter and the thickness direction of the layered printed matter.

With this configuration, the correction can be performed in consideration of both the displacement in the length direction and the displacement in the thickness direction, so that the occurrence of the displacement in the printing position of the layer image of each layer in the layered printed matter can be further suppressed.

Note that the controller 101 may perform only one of the above-described correction in the length direction and the above-described correction in the thickness direction, but from the viewpoint of improving correction accuracy, it is preferable to perform both the above-described correction in the length direction and the above-described correction in the thickness direction.

Furthermore, in FIG. 5, the displacement of the printing position in the layered printed matter formed of the continuous paper P is illustrated, but the correction can be performed similarly to the above for the printing position of the layered printed matter formed of the paper S that is the non-continuous paper.

Figure 7:
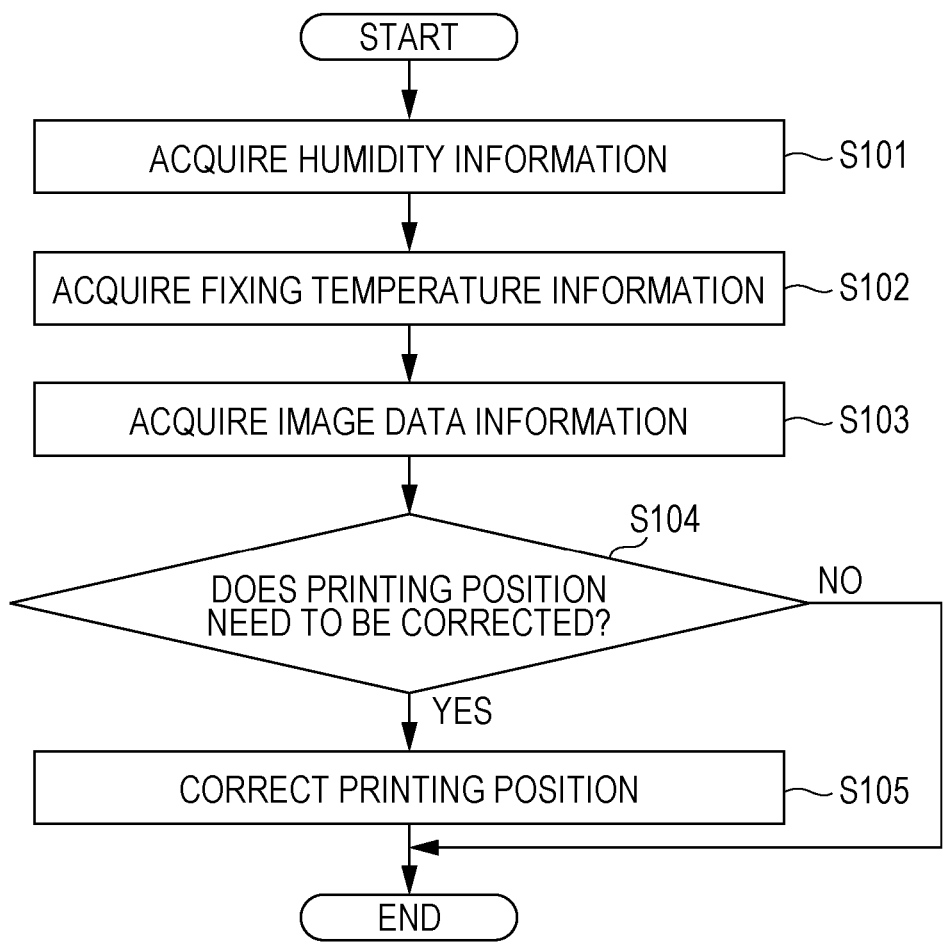
FIG. 7 is a flowchart illustrating an example of an operation of correction control of a printing position in a controller.

Next, an operation example when executing the correction control of the printing position in the controller 101 will be described. FIG. 7 is a flowchart illustrating an example of an operation of correction control of the printing position in the controller 101. The process in FIG. 7 is appropriately executed, for example, before the image forming apparatus 1 starts printing.

As illustrated in FIG. 7, the controller 101 acquires humidity information (step S101). After step S101, the controller 101 acquires temperature information of the fixing unit 60 (step S102). After step S102, the controller 101 acquires image data information (step S103). Note that the order of steps S101 to S103 may not be as described above.

Then, the controller 101 determines whether or not it is necessary to correct the printing position of the layer image (step S104). In step S104, for example, it is determined that the printing position of the layer image needs to be corrected when a displacement of a predetermined distance or more occurs in the length direction with respect to the target position according to the information of steps S101 and S102 or when the image area ratio is a predetermined area ratio or more according to the information of step S103.

The predetermined distance is any distance that affects the identification of the predetermined image, for example, when the layer image is shifted in the length direction. In addition, the predetermined area ratio is, for example, any area ratio such that the layer image is shifted in the thickness direction to have a thickness that affects the identification of the image by period.

As a result of the determination, when there is no need to correct the printing position of the layer image (Step S104, NO), this control ends. On the other hand, when it is necessary to correct the printing position of the layer image (YES in step S104), the controller 101 corrects the printing position of the layer image (step S105). After step S105, this control ends.

According to the present embodiment configured as described above, the printing position of the layer image of each layer in the predetermined image formed on the layered surface of the layered printed matter is corrected. Specifically, in a case where it is determined whether or not it is necessary to correct the printing position of the layer image, and it is determined that it is necessary to correct the printing position, the printing position of the layer image is corrected, so that it is possible to suppress the occurrence of the displacement in the printing position of the layer image of each layer in the layered printed matter.

Furthermore, by determining whether or not it is necessary to correct the printing position for each layer, the printing position of each layer image can be adjusted to an appropriate position, so that the predetermined image can be accurately expressed as a whole.

Furthermore, since the displacement of the printing position from the target position is estimated and the printing position is corrected based on the estimation result, the predetermined image can be accurately formed on the layered surface of the layered printed matter.

In the above embodiment, the control of determining whether or not it is necessary to correct the printing position of the layer image is performed, but the present invention is not limited thereto, and the control may not be performed, and for example, the correction amount of the printing position may be determined. Furthermore, in this case, for example, the control of "not performing correction" in the above-described embodiment is similar to determining the correction amount to 0.

In the above embodiment, the printing position of the layer image is corrected before the printing of the layered printed matter, but the present invention is not limited thereto, and the printing position of the layer image may be corrected during the printing of the layered printed matter.

Figure 8:
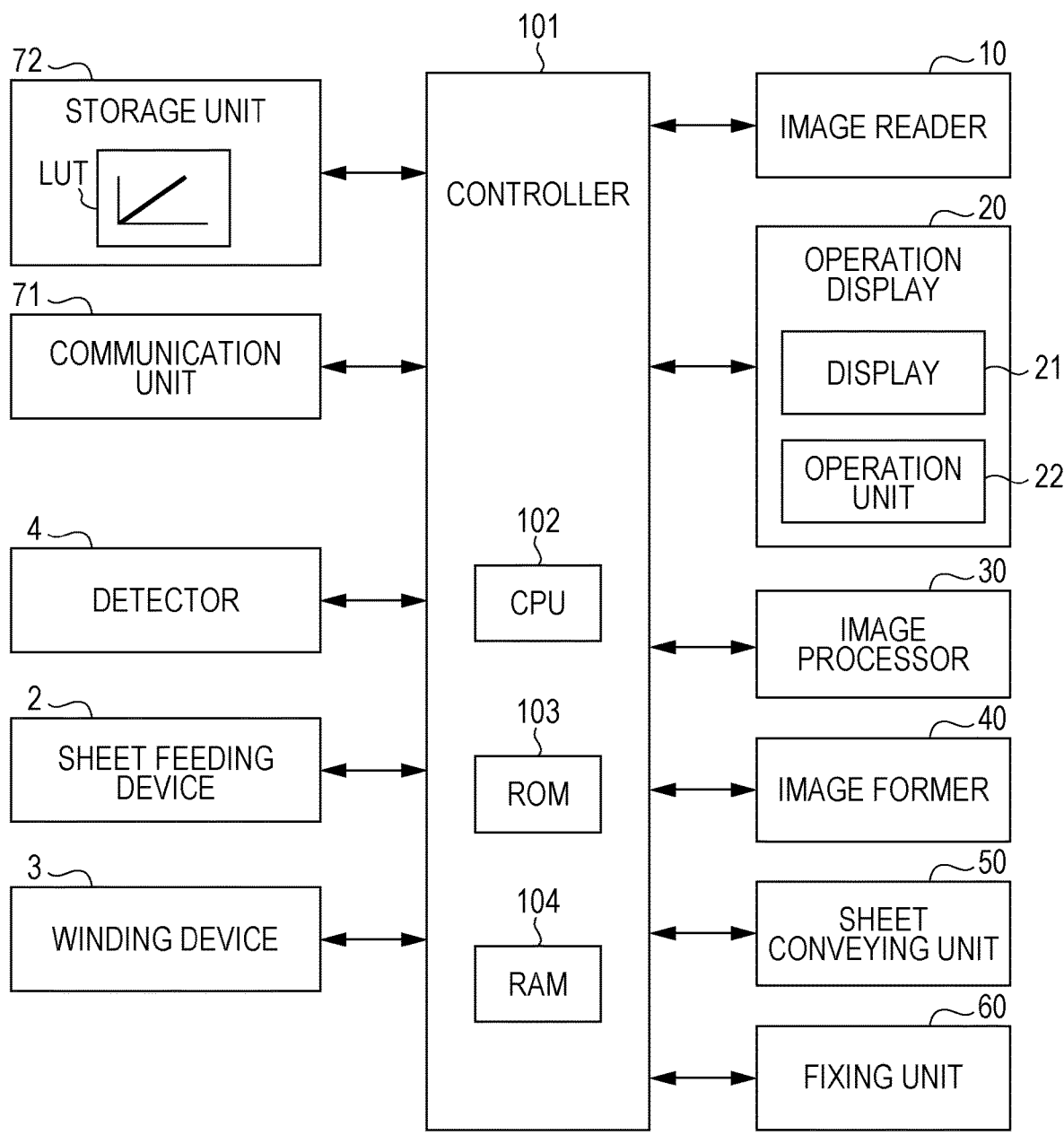
FIG. 8 is a diagram illustrating a main part of the control system of the image forming apparatus in the image forming system including a detector.

In this case, as illustrated in FIG. 8, the controller 101 corrects the printing position of the layer image on the medium on which the layer image is formed based on the detection result of the detector 4 provided in the image forming system 100.

The detector 4 is provided, for example, in the winding device 3, and detects the state of the layered printed matter during printing of the layered printed matter. Examples of the state of the layered printed matter during printing include a winding tension state of the continuous paper P in the winding device 3, a winding thickness state of the continuous paper P, and a winding rotation speed state of the continuous paper P.

When the state of the layered printed matter is the winding tension state of the continuous paper P, the detector 4 can detect, for example, a load applied to the winding shaft in the winding device 3. As the detector 4 in this case, for example, a known device can be applied.

The controller 101 acquires the detection result of the detector 4, that is, the information on the state of the layered printed matter being printed, and corrects the printing position of the layer image to be forward when the load applied to the winding shaft is large, that is, when the winding tension of the continuous paper P is high. The controller 101 performs correction so as to displace the printing position of the layer image backward when the load applied to the winding shaft is small, that is, when the winding tension of the continuous paper P is low.

When the winding tension of the continuous paper P becomes high, the continuous paper P is wound in a pulled state and the diameter of the roll-shaped layered printed matter becomes smaller than the ideal state. As a result, the printing position of the layer image is displaced backward from the target position. On the other hand, when the winding tension of the continuous paper P becomes small, since the continuous paper P is wound in a loosened state, the diameter of the roll-shaped layered printed matter becomes larger than the ideal state, and the printing position of the layer image is displaced forward from of the target position.

Therefore, by correcting the printing position as described above, the displacement of the printing position of the layer image can be canceled.

When the state of the layered printed matter is the state of the winding thickness of the continuous paper P, the detector 4 can detect the thickness of the continuous paper P wound by the winding device 3, for example. As the detector 4 in this case, for example, a known device can be applied.

The controller 101 acquires the detection result of the detector 4, and corrects the printing position of the layer image to be backward when the winding thickness is large. The controller 101 corrects the printing position of the layer image forward when the winding thickness is small.

When the winding thickness of the continuous paper P is large, the diameter of the roll-shaped layered printed matter is larger than that in the ideal state, and thus the printing position of the layer image is displaced forward from the target position. On the other hand, when the winding thickness of the continuous paper P becomes small, the diameter of the roll-shaped layered printed matter becomes smaller than that in the ideal state, and thus the printing position of the layer image is displaced backward from the target position.

Therefore, by correcting the printing position as described above, the displacement of the printing position of the layer image can be canceled.

When the state of the layered printed matter is the state of the winding rotation speed of the continuous paper P, the detector 4 can detect, for example, the rotation speed of the winding shaft in the winding device 3. As the detector 4 in this case, for example, a known device can be applied.

The controller 101 acquires the detection result of the detector 4, and performs correction to displace the printing position of the layer image forward when the winding rotation speed on the continuous paper P is large. In a case where the winding rotation speed of the continuous paper P is small, the controller 101 performs correction so as to displace the printing position of the layer image backward.

When the winding rotation speed of the continuous paper P is large, the continuous paper P is wound faster than in the ideal state. Therefore, the diameter of the roll-shaped layered printed matter is smaller than in the ideal state, and the printing position of the layer image is displaced backward from the target position. On the other hand, in a case where the winding rotation speed of the continuous paper P is small, since the continuous paper P is wound slower than the ideal state, the diameter of the roll-shaped layered printed matter becomes larger than the ideal state, and the printing position of the layer image is displaced forward from the target position.

Therefore, by correcting the printing position as described above, the displacement of the printing position of the layer image can be canceled.

Figure 9:
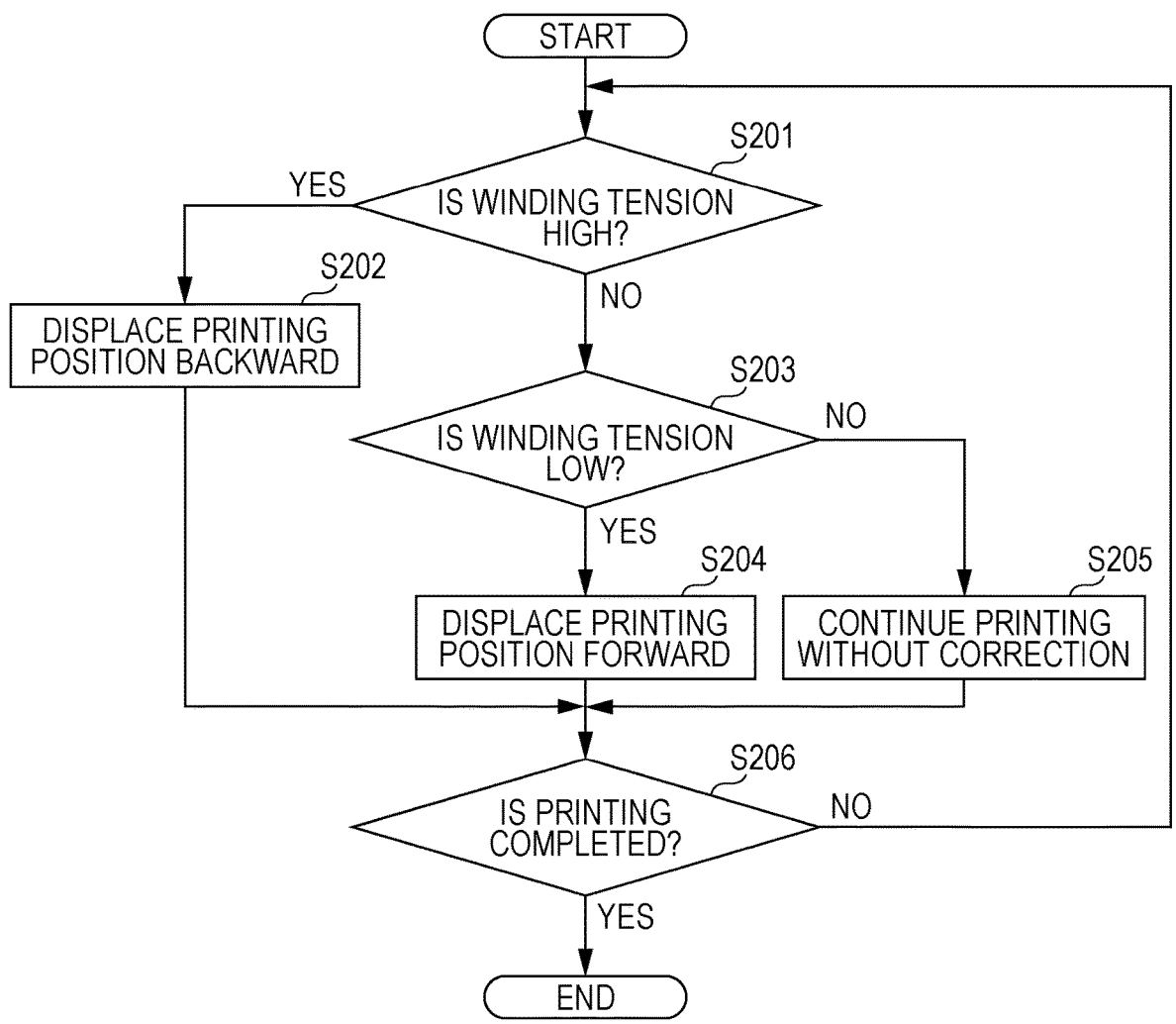
FIG. 9 is a flowchart illustrating an example of an operation of correction control of a printing position in a controller in FIG. 8.

Next, an operation example when executing the correction control of the printing position of the controller 101 in the configuration including the detector 4 will be described. FIG. 9 is a flowchart illustrating an example of the operation of the correction control of the printing position of the controller 101 in the configuration including the detector 4. The process in FIG. 9 is appropriately executed, for example, after the image forming apparatus 1 starts printing. The detector 4 in FIG. 9 detects the winding tension in the winding device 3.

As illustrated in FIG. 9, the controller 101 acquires, from the detector 4, information on the state of the layered printed matter during printing, and determines whether or not the winding tension in the winding device 3 is high (step S201). As a result of the determination, when the winding tension is high (YES in step S201), the controller 101 performs control to displace the printing position of the layer image backward (step S202).

On the other hand, if the winding tension is not high (step S201, NO), the controller 101 determines whether or not the winding tension in the winding device 3 is low (step S203). As a result of the determination, when the winding tension is low (YES in step S203), the controller 101 performs control to displace the printing position of the layer image forward (step S204).

On the other hand, if the winding tension is not low (step S203, NO), the controller 101 continues printing without correcting the printing position (step S205). After step S202, step S204, or step S205, the controller 101 determines whether printing has been completed (step S206).

As a result of the determination, in a case where the printing is not finished (step S206, NO), the processing returns to step S201. On the other hand, when printing is finished (YES in step S206), this control ends.

Even with such a configuration, it is possible to suppress the occurrence of deviation in the printing position of the layer image of each layer in the layered printed matter.

Furthermore, since the detection result of the detector 4 is fed back during printing to correct the printing position of the layer image, the printing position can be corrected in real time during printing.

Furthermore, in the configuration illustrated in FIG. 8, the printing position after the start of printing may be corrected after correcting the printing position before the start of printing in the configuration illustrated in FIG. 2.

Furthermore, in the configuration illustrated in FIG. 8, only the correction of the layered printed matter formed of the continuous paper P has been described, but the present invention is also applicable to the correction of the layered printed matter formed of the paper S that is the non-continuous paper. In this case, the detector 4 can be, for example, a sensor capable of detecting the height of the layered printed matter being printed or a sensor capable of detecting the position in the length direction of the layer image (for example, a scanner).

In the above embodiment, the electrophotographic image forming apparatus is used, but the present invention is not limited thereto, and for example, another type of image forming apparatus such as an inkjet type may be used.

Although embodiments of the present invention have been described and illustrated in detail, the disclosed embodiments are made for purposes of illustration and example only and not limitation. The scope of the present invention should be interpreted by terms of the appended claims. In other words, the present invention can be implemented in various forms without departing from the gist or main features thereof.

What is claimed is:

1. An image forming apparatus for forming a predetermined image on a layered surface of a layered printed matter, the layered printed matter including a plurality of layers that are stacked, the layered surface being formed by a plurality of end surfaces of the plurality of layers or a plurality of cross sections of the plurality of layers cut in the post-processing, the image forming apparatus comprising:
    an image former that forms a plurality of layer images on the plurality of layers, respectively, each of the plurality of layer images expressing a different one of parts of the predetermined image; and
    a hardware processor that corrects a plurality of printing positions of the plurality of layer images.

2. The image forming apparatus according to claim 1, wherein
    for each of the plurality layer images, the hardware processor estimates a displacement of the printing position of the layer image in image data from a target position and corrects the printing position when it is estimated that the displacement of the printing position may occur.

3. The image forming apparatus according to claim 1, wherein
for each of the plurality layer images, the hardware processor
determines whether or not the correction of the printing position is needed, and
corrects the printing position when it is determined that the correction of the printing position is needed.

4. The image forming apparatus according to claim 1, wherein
for each of the plurality layer images, the hardware processor corrects the printing position in a longitudinal direction of a medium included in the layered printed matter.

5. The image forming apparatus according to claim 4, wherein
the medium included in the layered printed matter is a continuous paper that is wound in a roll shape when forming the layered printed matter.

6. The image forming apparatus according to claim 1, wherein
for each of the plurality layer images, the hardware processor corrects the printing position in a thickness direction of the layered printed matter.

7. The image forming apparatus according to claim 1, wherein
for each of the plurality layer images, the hardware processor corrects the printing position in a longitudinal direction of a medium included in the layered printed matter and in a thickness direction of the layered printed matter.

8. The image forming apparatus according to claim 1, wherein
for each of the plurality layer images, the hardware processor corrects the printing position of the layer image on the medium on which the layer image is formed, according to a state of the layered printed matter while printing the layered printed matter.

9. The image forming apparatus according to claim 1, wherein
the hardware processor
acquires information on at least one of a fixing temperature of the image forming apparatus, humidity outside the image forming apparatus, an image area ratio related to the predetermined image, a winding tension state of a continuous paper in a winding device, a winding thickness state of a continuous paper, and a winding rotation speed state of a continuous paper; and
corrects the plurality of printing positions of the plurality of layer images based on the information.

10. A correction method in an image forming apparatus for forming a predetermined image on a layered surface of a layered printed matter, the layered printed matter including a plurality of layers that are stacked, the layered surface being formed by a plurality of end surfaces of the plurality of layers or a plurality of cross sections of the plurality of layers cut in the post-processing, the image forming apparatus, the image forming apparatus including an image former that forms a plurality of layer images on the plurality of layers, respectively, each of the plurality of layer images expressing a different one of parts of the predetermined image, the method comprising:
correcting a plurality of printing positions of the plurality of layer images; and
forming the plurality of layer images at the plurality of corrected printing positions respectively.

11. The correction method according to claim 10, further comprising:
acquiring information on at least one of a fixing temperature of the image forming apparatus, humidity outside the image forming apparatus, an image area ratio related to the predetermined image, a winding tension state of a continuous paper in a winding device, a winding thickness state of a continuous paper, and a winding rotation speed state of a continuous paper, wherein
the correcting of the plurality of printing positions of the plurality of layer images including correcting the plurality of printing positions of the plurality of layer images based on the information.

12. A non-transitory recording medium storing a computer readable correction program for an image forming apparatus for forming a predetermined image on a layered surface of a layered printed matter, the layered printed matter including a plurality of layers that are stacked, the layered surface being formed by a plurality of end surfaces of the plurality of layers or a plurality of cross sections of the plurality of layers cut in the post-processing, the image forming apparatus, the image forming apparatus including an image former that forms a plurality of layer images on the plurality of layers, respectively, each of the plurality of layer images expressing a different one of parts of the predetermined image, the program causing a computer to perform:
correcting a plurality of printing positions of the plurality of layer images; and
forming the plurality of layer images at the plurality of corrected printing positions, respectively.

13. The non-transitory recording medium storing the computer readable correction program according to claim 10, the program causing the computer to further perform:
acquiring information on at least one of a fixing temperature of the image forming apparatus, humidity outside the image forming apparatus, an image area ratio related to the predetermined image, a winding tension state of a continuous paper in a winding device, a winding thickness state of a continuous paper, and a winding rotation speed state of a continuous paper, wherein
the correcting of the plurality of printing positions of the plurality of layer images including correcting the plurality of printing positions of the plurality of layer images based on the information.

* * * * *